United States Patent [19]

Lopez

[11] Patent Number: 4,770,775

[45] Date of Patent: Sep. 13, 1988

[54] APPARATUS FOR THE PRODUCTION OF FRESH WATER FROM SEA WATER BY REVERSE OSMOSIS

[76] Inventor: Fernand Lopez, 27 rue Emile Barrière, 31200 Toulouse, France

[21] Appl. No.: 68,266

[22] PCT Filed: Sep. 29, 1986

[86] PCT No.: PCT/FR86/00333

§ 371 Date: Jun. 10, 1987

§ 102(e) Date: Jun. 10, 1987

[87] PCT Pub. No.: WO87/02348

PCT Pub. Date: Apr. 23, 1987

[30] Foreign Application Priority Data

Oct. 10, 1985 [FR] France ................. 85 15532

[51] Int. Cl.$^4$ ............................................. B01S 31/00
[52] U.S. Cl. ........................... 210/321.83; 210/433.2; 210/416.1
[58] Field of Search ........... 210/416.1, 321.83, 321.87, 210/433.2

[56] References Cited

U.S. PATENT DOCUMENTS

| | | | |
|---|---|---|---|
| 4,187,173 | 2/1980 | Keefer | 210/637 |
| 4,421,461 | 12/1983 | Hicks et al. | 210/416.1 |
| 4,452,696 | 6/1984 | Lopez | 210/321.87 |
| 4,512,886 | 4/1985 | Hicks et al. | 210/416.1 |

FOREIGN PATENT DOCUMENTS 2088968  6/1982  United Kingdom ............ 210/416.1

Primary Examiner—Richard V. Fisher
Assistant Examiner—Coreen Y. Lee
Attorney, Agent, or Firm—Harold H. Dutton, Jr.

[57] ABSTRACT

The invention relates to an apparatus for the production of fresh water from seawater, intended to be immersed into the marine medium. The apparatus comprises one high pressure chamber (1) containing a selective semi-permeable reverse osmosis membrane (11) and a bell chamber (14) having an internal axial piston permitting by a multiplier effect, to obtain at the interior of the chamber (1) a pressure equal to the exterior pressure multiplied by a ratio S/s of the working surfaces of the bell chamber and the internal piston. The semi-permeable membrane communicates across a separation wall (3) of the high pressure chamber with the interior volume of the bell chamber (14). This internal volume is placed in communication with the surface by a flexible tube (25) in such a manner as to play the dual role of, on one hand, a subatmospheric gas chamber, and on the other hand means for receiving fresh water after osmosis across the membrane.

13 Claims, 2 Drawing Sheets

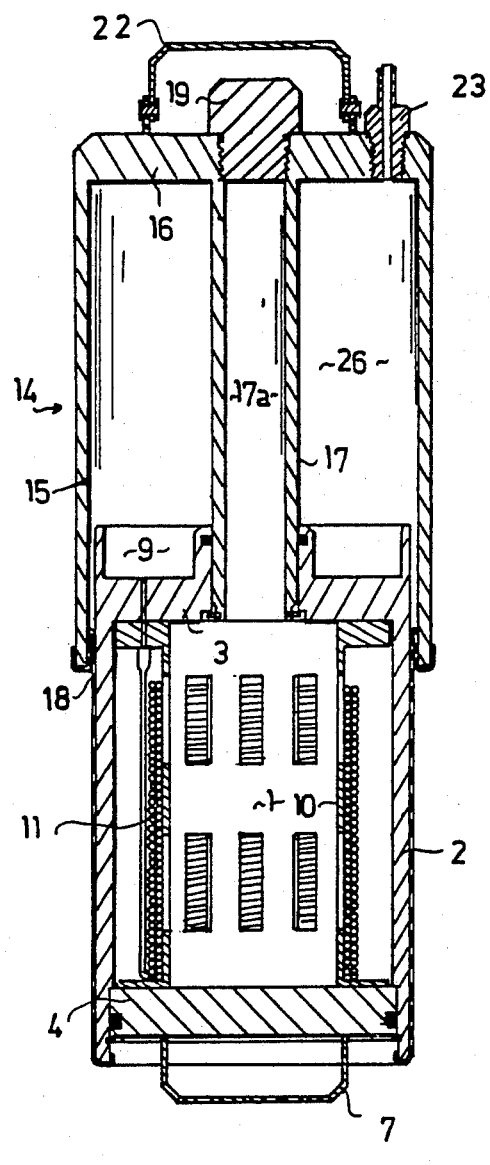
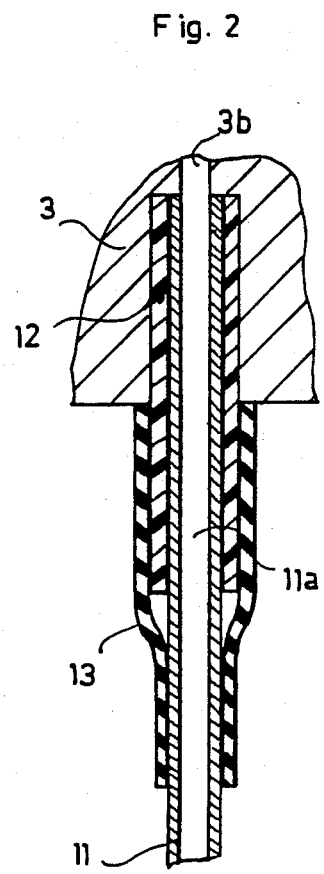
Fig. 2
Fig. 3

APPARATUS FOR THE PRODUCTION OF FRESH WATER FROM SEA WATER BY REVERSE OSMOSIS

The invention relates to an apparatus for the production of soft water from sea water, by filtration across one or several selective semi-permeable reverse osmosis membranes. This apparatus may in particular be applied for a survival apparatus able to deliver fresh water to ship wrecked persons, but for providing a ship with fresh water, or even for industrially producing fresh water on a coastal platform.

French Pat. No. 81.07185 in the name of the applicant (equivalent to U.S. Pat. No. 4,452,696) describes an apparatus of this type. Immersed in the marine medium to a moderate depth (particularly on the order of 15–35 meters), this apparatus pushes across the semi-permeable membrane an elevated pressure (for example on the order of 50 bars) appropriate for assuring the carrying out of the reverse osmosis process.

The present invention proposes to furnish an improved device operating according to the same principle as the apparatus previously provided.

A primary object of the invention is to simplify the structure of the apparatus, while reducing the costs of manufacture and the space occupied by the apparatus. In particular, the invention provides an apparatus particularly well suited for survival apparatus of a small size.

Another object is to noticeably increase the reliability of operation of the device and the duration of its life.

Another object is to provide a device in which the osmotic filtration maintains a constant efficiency during the process of producing fresh water (constant speed of filtration throughout the filtration process).

The apparatus provided by the invention is intended to be immersed into a marine medium and comprises means for recovering the fresh water produced, a chamber, termed a high pressure chamber, adapted to contain sea water preparatory to its treatment, at least one selective semi-permeable membrane adpated to achieve a filtration by reverse osmosis of sea water contained in the high pressure chamber, the said membrane being arranged in such a manner that one of its active faces, termed the upstream active face, communicates with the said high pressure chamber and the other active face, termed the downstream active face, communicates with the fresh water receiving means, a bell chamber movable with respect to the high pressure chamber, comprising a peripheral wall adapted to be capable of being displaced lengthwise of the high pressure chamber, a piston internal to the surface able to penetrate to a variable depth in the high pressure chamber across a separation wall situated between the chamber and the bell chamber, a closing wall, of the working surface (S) situated opposite the working surface (s) of the piston and subject to the pressure of the exterior medium, the said working surface (S) of the closing wall being of greater size than the working surface (s) of the piston, a subatmospheric gas chamber situated in the interior volume of the bell chamber around the internal piston thereof.

According to one characteristic of the present invention, the separation wall of the high pressure chamber comprises communication means connected to the semi-permeable membrane and adapted to bring the downstream active face of the membrane into communication with the interior volume of the bell chamber in such a manner that said interior volume fulfills the dual role of subatmospheric gas chamber and the fresh water receiving means, the bell chamber being provided with means for withdrawing the fresh water contained in its interior volume.

In the improved apparatus according to the invention, the fresh water receiving stage is positioned together with the subatmospheric gas chamber and, as will be understood more clearly hereinafter, this arrangement permits a significant simplification of the apparatus and a reduction of its bulk with equal performance.

The means for withdrawing the fresh water may very simply comprise a water tight removable plug screwed into the bell chamber in such as manner as to permit the withdrawal of water contained therein.

Additionally, a flexible air purge tube is advantageously connected to the bell chamber for placing the chamber under atmospheric gas pressure in communication with the surface. Thus, this chamber which also serves as a fresh water receiver, is placed under constant pressure regardless of the position of the bell chamber and regardless of the volume of fresh water already filtered; at a given depth, the working pressure on the osmotic membrane (pressure difference between the upstream active face situated in the high pressure chamber and the downstream active face in communication with the subatmospheric gas chamber) remains constant, so that the speed of this filtration is subject to no diminution during the filtration. In the case of a survival apparatus, the flexible tube mentioned above is preferably of sufficient strength to enable it to serve as the means for lowering or raising the apparatus in the marine medium.

During the filtration process, the bell chamber is displaced with respect to the high pressure chamber under the effect of the exterior pressure, between an extreme extraction position and an extreme penetration position. According to another characteristic of the invention, the repositioning of the apparatus is carried out at the surface manually by the operator, through the use of two external maneuvering handles, provided one on one side of a wall of the bell chamber, and the other on the side opposite on a wall of the high pressure chamber. After recovering the water, the operator exerts a traction on these handles in such a manner as to return from the position of extreme penetration to the position of extreme extraction. All return accessories are thus eliminated for carrying out this operation.

The semi-permeable reverse osmosis membrane may be of a known type. In particular, this membrane may be a tubular membrane of a type known per se (of cellose acetate, aromatic polyamide, or others), rolled in a spiral manner in the high pressure chamber. The upstream active face of this membrane is thus composed of the external face of the tube which forms it, and bathes in the sea water contained in the high pressure chamber, however the downstream active face is formed by the internal face of the membrane and is in communication with the subatmospheric gas chamber for insuring the outflow of filtered fresh water toward the same. The communication means comprises in particular a tubular ferrule disposed in a passageway which traverses the separation wall situated between the high pressure chamber and the subatmospheric gas chamber.

This ferrule is adapted to maintain one extremity of the tubular membrane in such a manner that the downstream active face (internal face) communicates directly and in a sealing manner with the subatmospheric gas chamber. The other end of the semi-permeable membrane may be closed in such a manner that outflow of fresh water is carried out across a single extremity; this other extremity may also be fixed on another ferrule, in the same manner as the first, for permitting an outflow of filtered water across the two extremities.

In addition, according to another characteristic of the invention, the internal piston may be traversed interiorly by a passageway for admitting salt water, said passageway terminating at one end in the high pressure chamber, and at the other end, in the exterior of the closing wall of the bell chamber, a removal plug being sealingly mounted in this later extremity in order to enable the filling of the high pressure chamber. This arrangement permits lightening the apparatus.

In another version, the internal piston may be solid, a filling orifice having a removable plug being provided in the end of the high pressure chamber in order to enable the filling of this chamber.

Other characteristics, purposes and advantages of the invention will become apparent from the description which follows with reference to the attached drawings which show by way of nonlimiting example one embodiment of a survival apparatus in accordance with the present invention; in these drawings form an integral part of the present description:

FIG. 2 is a detailed cross-section;

FIG. 3 is an axial cross-section on reduced scale of the extreme extraction position.

Figure 1:
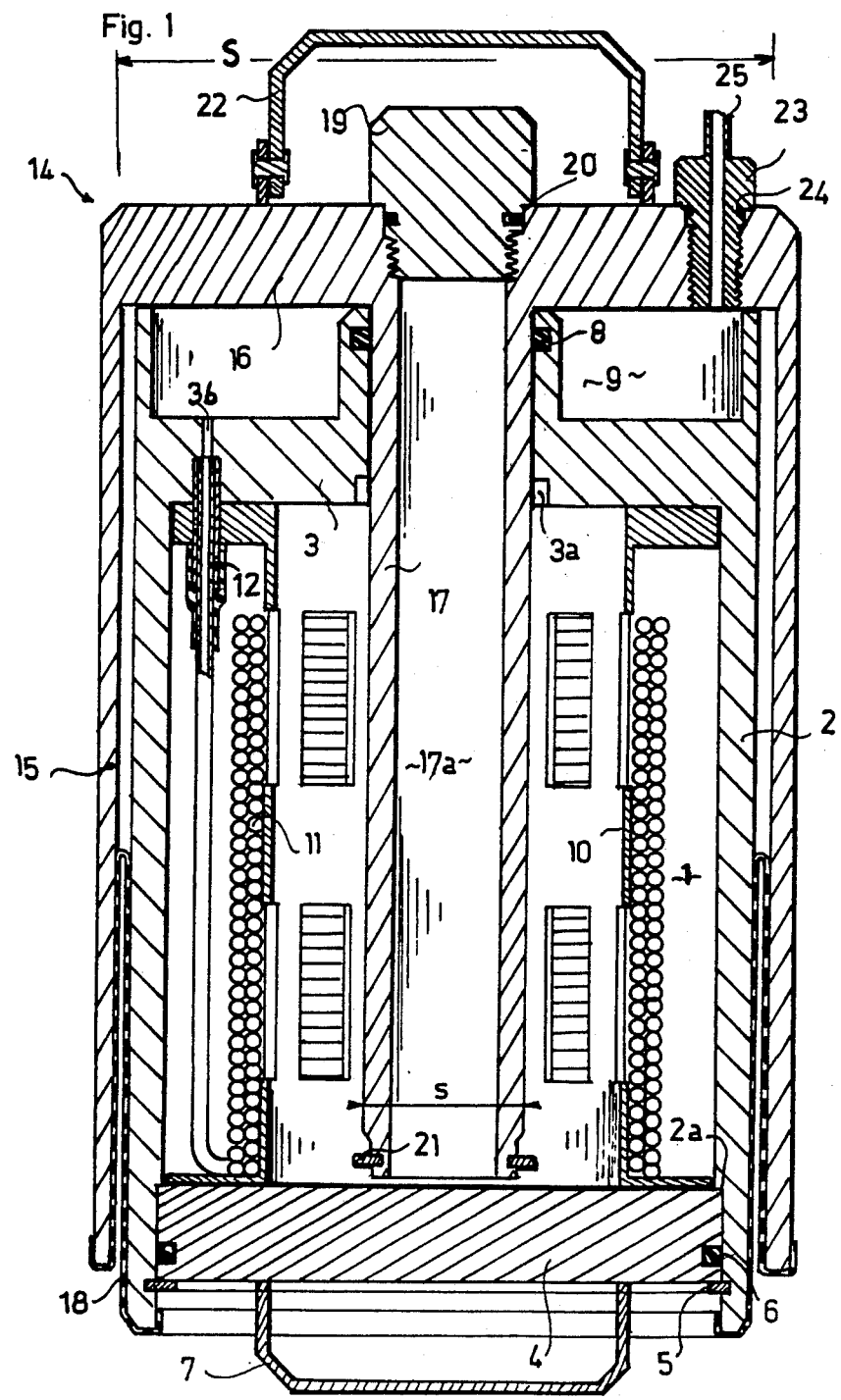
FIG. 1 is an axial cross-sectional view of the apparatus in the extreme penetration position, essentially on a scale of one.

The survival apparatus represented by way of example in the drawings is intended to equip life boats to enable one or several shipwrecked persons to produce fresh water from sea water, even in water, in terms of operations easy to be carried out.

This apparatus comprises essentially two assemblies movable one with respect to the other.

The first assembly defines a chamber 1, termed the high pressure chamber, and is defined by a cylindrical body 2 which carries at one end a wall 3 termed a separation wall, integral with the body 2. At the other extremity, the body 2 carries an inset circular wall 4 which is held against a shoulder 2a by a clip 5.

An O-ring sealing joint 6 assures water tightness around the wall 4. Further, an external handle 7 is fixed on this wall 4 in order to permit the handling of the apparatus.

The separation wall 3 is traversed by cylindrical, axial passageway having an enlargement 3a at its base and a groove in which is positioned an O-ring seal 8.

Further, the separation wall 3 defines on the side opposite the high pressure chamber 1 an annular compartment 9 intended to receive the fresh water produced.

The high pressure chamber 1 contains a cylindrical perforated spool 10 which extends between the walls 3 and 4 around the axial volume situated immediately below the enlargement mentioned above. This spool supports a tubular stocking 11 which is rolled spirally therearound, and is made of the tubular semi-permeable reverse osmosis membrane of a known type, for example cellose acetate.

As shown in detail in FIG. 2, an extremity 11a of the tubular membrane penetrates into a tubular rigid ferrule 12 the internal diameter of which corresponds to the external diameter of the membrane. This ferrule is fitted and adhered in a canal 3b whereby the separation wall 3 is pierced, in order to come into contact with a shoulder of this passageway; the passageway 3b empties at the bottom of the annular compartment 9 mentioned above.

A latex sleeve 13 engages the depending part of the ferrule 12 and the tubular membrane 11, in order to assure the water tight seal. It should be noted that this arrangement assures an excellent seal which increases with the pressure prevailing in the high pressure chamber 1.

The other extremity of the semipermeable membrane 11 may be closed; it is also possible to connect this other extremity to another ferrule arranged like the first to assure flowing of the water in both directions. This latter arrangement would appear desireable in the case in which the length of the braid forming the membrane exceeds 30 meters, in order to reduce losses of charge (it should be noted that these are very slight by reason of the low flow through the drain.

The sedons assembly of the apparatus comprises a bell chamber 14 arranged to be displaced axially along the first assembly between a first extreme termed a penetration extreme (FIG. 1) and a second opposite extreme termed an extraction position (FIG. 3).

The bell chamber 14 defines, with the separation wall 3, a chamber 26 which is called the subatmospheric gas chamber, of a variable volume; this bell chamber is formed by a peripheral wall 15, a closing wall 16 and an internal piston 17.

The peripheral wall 15 surrounds the body 2 of the high pressure chamber 1 and is connected to a sealing membrane 18 of which ane edge is fixed on the peripheral wall and the other edge is fixed to the cylindrical body. This membrane which unrolls as and in relation to the sliding of the bell chamber may in particular be formed of a membrane of an elastomeric fabric such as "Bellofram" made by the "Le Joint Francais" company.

The closing wall 16 has a working surface 'S' on the order of 50 to 120 cm$^2$ for a survival apparatus. (By "working surface" is meant the surface of the said wall upon which is applied the external pressure without equal opposite counter-pressure).

The internal piston 17 is arranged in such a manner as to be able to slide axially in the chimney of the separation wall 3, the seal being assured by the joint 8.

In the example, this piston is internally provided with a passageway 17a for admitting sale water, which exits, at one end, into the high pressure chamber 1 and, at the opposite end, to the exterior of the closing wall 16. At this latter extremity, the passageway is provided with threads to receive a removable plug 19, and also is provided with an O-ring seal 20.

The piston 17 has a working surface 's' (upon which the pressure prevailing in the high pressure chamber is applied) the size of which is considerably smaller than the above mentioned surface 'S'; for example, the surface 's' may be on the order of 3 to 5 cm$^2$.

The piston 17 is provided at its free end with a clip 21 which, in the extreme extraction position, comes into contact with the separation wall 3 in the notch space 3a (on the high pressure chamber side 1); in the extreme penetration position, the closing wall 16 of the bell chamber comes into contact with the edge of the annular compartment 9.

The closing wall 16 of the bell chamber includes a handle 22, hinged on the two fixed pivots on the outside of this wall, in order to permit handling of the device.

In addition, a removable plug 23 is provided in this wall 16 with the interposition of an O-ring seal 24; this plug permits removal of fresh water contained in the annular compartment 9 after filtration.

A flexible air purge tube 25 is connected to the bell chamber 14 in such a manner as to place the subatmospheric gas pressure chamber 26 in communication with the surface. This tube is, in this example, fixed at its extremity to the plug 23 which has a passageway therethrough.

The tube 25 may have a length on the order of 25 to 30 meters; it is made from a material of appropriate resistance to permit suspending the apparatus in order to lower it and to retrieve it from the sea. For example, the tube 25 may be made of a flexible, reinforced synthetic material.

One can achieve structural simplicity of the apparatus in which the costs of manufacture and assembly are noticeably reduced with respect to the previously described apparatus. Its functionning, of which the general principle is the same as that of the previous device, is described hereafter.

The user arranges the device in the extreme extraction position (FIG. 3), by exerting a tractile force on the handles 7 and 22, the plug 19 being removed. Then, through the passageway 17a of the piston, the user fills the high pressure chamber 1 with seawater up to the upper end of the passageway 17a, and replaces the plug 19.

It should be noted that in another version of the apparatus, the piston 17 would be solid, the filling being carried out by a plug provided in the opposite wall 4. The flexible tube may then be connected to the center of the wall 16 at right angles with the piston with a fitting provided therein for discharging into the chamber 26.

The user then immerses the device while holding onto the flexible tube 25 which will also serve as a retrieval means; this tube may be rolled around a rotating spool for facilitating this operation. The depth of immersion may be on the order of 25 to 30 meters. At this depth, the relative exterior pressure on the order of 2 to 2.5 bars is applied to the surface "S" of the bell chamber and pushes the same toward the high pressure chamber; the water in this chamber is subjected by the intervention of the surface "s" of the piston to a pressure of about 50 bars (a multiplication factor of the exterior pressure equal to S/s). This pressure roughly double the osmotic pressure of seawater of average salinity assures carrying out the phenomenon of reverse osmosis across the membrane 11. The fresh water produced flows into the compartment 9 of the subatmospheric gas chamber 26. As the filtration proceeds, the bell chamber 14 is forced toward the high pressure chamber 1 and the piston 17 penetrates therein.

The subatmospheric gas chamber 26 is at the pressure at the surface, and no means of return is provided between the two movable assemblies, the absolute counter pressure being equal to about 1 bar and not subjected to any increase because of the penetration of the piston (this is the case because of the volume of fresh water provided in the chamber 26, or the reduction of the volume thereof or the compression of a return means); thus, the filtration by reverse osmosis is carried out with an almost constant speed until the piston is entirely penetrated into the high pressure chamber (extreme penetration position of FIG. 1). A volume of fresh water equal to the volume of water displaced by the piston in the high pressure chamber is thus produced and flows toward the compartment 9.

The operator then retrieves the device and removes the fresh water by means of the plug 23.

The device may be re-used as before after rearming by means of the handles 7 and 22 after removing the plug 19. It should be noted that it is desireable to empty the high pressure chamber 1 after each operation to avoid an increase in the salinity of the water contained therein.

The sealing membrane 18 of "Bellofram" arranged between the two movable assemblies enables the displacement of these two assemblies with reduced friction. Moreover, it totally isolates the surrounding salt water and the fresh water obtained, while preventing the opposite faces of the cylindrical wall 15 and the body 2 from being wetted by sea water. Another advantage of this type of membrane resides in the great tolerance of use which it permits for the opposite walls.

I claim:

1. Apparatus for the production of fresh water from seawater, adapted to be immersed into the marine medium, of the type comprising:

means for collecting fresh water produced (9), a chamber (1), called a high pressure chamber, adapted to contain seawater preparatory to its treatment, at least one selective semi-permeable membrane (11) adapted to carry out a filtration by reverse osmosis of the seawater contained in the high pressure chamber, said membrane being arranged in such a manner that one of its faces, termed the upstream active face, communicates with said high pressure chamber and the other active face, termed the downstream active face, communicates with the fresh water collecting means, a bell chamber (14) movable with respect to the high pressure chamber comprising:

on one part, a peripheral wall adapted to be displaced lengthwise along the high pressure chamber, on the other part, an internal piston having a working surface (s) able to penetrate to a variable depth in the high pressure chamber across a separation wall (3) situated between the said chamber and said bell chamber, a closing wall (16) having a working surface (S) situated opposite the working surface (s) of the piston and subject to pressure of the exterior medium, said working surface (S) of the closing wall being of greater size than said working surface of the piston, a subatmospheric gas chamber (26) situated in the interior volume of the bell chamber around the internal piston thereof, said separation wall (3) of the high pressure chamber (1) further comprising communication means (12, 3b) connected to the semi-permeable membrane (11) for bringing the downstream active face of said membrane into communication with the interior volume of the bell chamber (14) in such a manner that said interior volume fulfills the dual role of sub-atmospheric gas chamber (26) and fresh water recovering means (9), the bell chamber (14) being provided with means (23) for receiving the fresh water contained in its interior volume.

2. An apparatus according to claim 1, in which the internal piston (17) includes interiorly a passageway for admitting salt water (17a), said passageway emptying at one end into the high pressure chamber (1) and, at the opposite end, to the outside of the closing wall (16) of the bell chamber, a removable plug (19) being sealingly provided at this latter end for permitting refilling of the high pressure chamber.

3. An apparatus according to claim 1, in which the internal piston is solid, a filling orifice having a removable plug being provided in the bottom of the high pressure chamber for permitting refilling of said high pressure chamber.

4. An apparatus according to claim 1, in which the separation wall (3) of the high pressure chamber defines, on the side of the subatmospheric gas chamber, an annular compartment for receiving fresh water (9) opening into said sub-atmospheric gas chamber, said communication means (12, 3b) emptying into the bottom of said compartment (9).

5. An apparatus according to claim 4 in which the bell chamber (14) is equipped in such a manner as to be displaceable between two extreme positions with respect to the high pressure chamber (1), a penetration position wherein the closing wall (16) comes into abutment with an edge of the annular compartment (9), and an extraction position wherein the free extremity of the piston (17) comes into abutment by means of a clip (21) against the separation wall (3) on the side of the high pressure chamber.

6. An apparatus according to claim 1, in which the semi-permeable membrane is a tubular membrane rolled in spirals in the high pressure chamber (1), said apparatus being characterized in that said communication means comprises at least one tubular ferrule (12) disposed in a passageway (3b) traversing the separation wall (3) situated between the high pressure chamber (1) and the sub-atmospheric gas chamber (26), said ferrule (12) being adapted to maintain one extremity (11a) of the tubular membrane in such a manner that its downstream active face formed by its internal face communicates directly and in a sealing manner with the subatmospheric gas chamber (26).

7. An apparatus according to claim 6, in which the tubular membrane (11) is rolled around perforated spindle (10), disposed in the high pressure chamber (1) around the volume of penetration of the piston (17).

8. An apparatus according to claim 1, in which the fresh water receiving means comprises a removable plug (23) sealingly screwed into the bell chamber (14) in such a manner as to permit removal of the water contained therein.

9. An apparatus according to claim 1, in which a flexible air purge tube (25) is connected to the bell chamber (14) for placing the sub-atmospheric gas chamber (26) in communication with the surface.

10. An apparatus according to claim 9, in which the flexible tube (25) has sufficient strength to serve as lowering means or raising means for the apparatus in the marine medium.

11. An apparatus according to claim 1, in which it includes two external handles (7, 22) situated one on the closing wall (16) of the bell chamber, the other on a wall (4) of the high pressure chamber, situated opposite.

12. An apparatus according to claims 11 in which the high pressure chamber is defined by:
   a cylindrical body (2) bearing the separation wall (3) for forming an assembly of one part,
   a circular wall (4) sealingly clipped in the body (2) at the end opposite the separation wall, this circular wall (4) bearing on the external side one of said handles (7).

13. An apparatus according to claim 1, in which a sealing membrane (18) is disposed between the bell chamber (14) and the body (2) of the high pressure chamber.

* * * * *